Patented Aug. 20, 1940

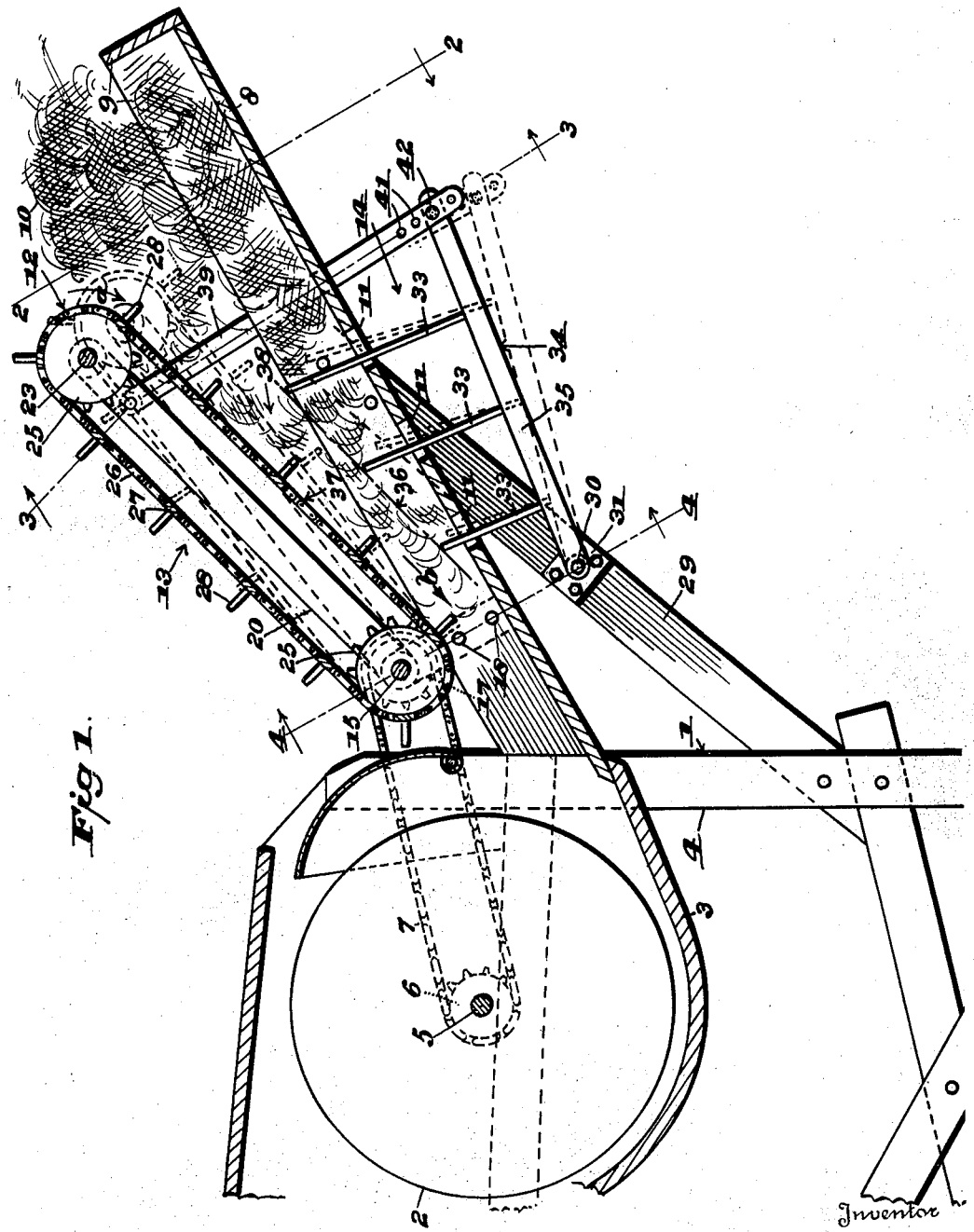

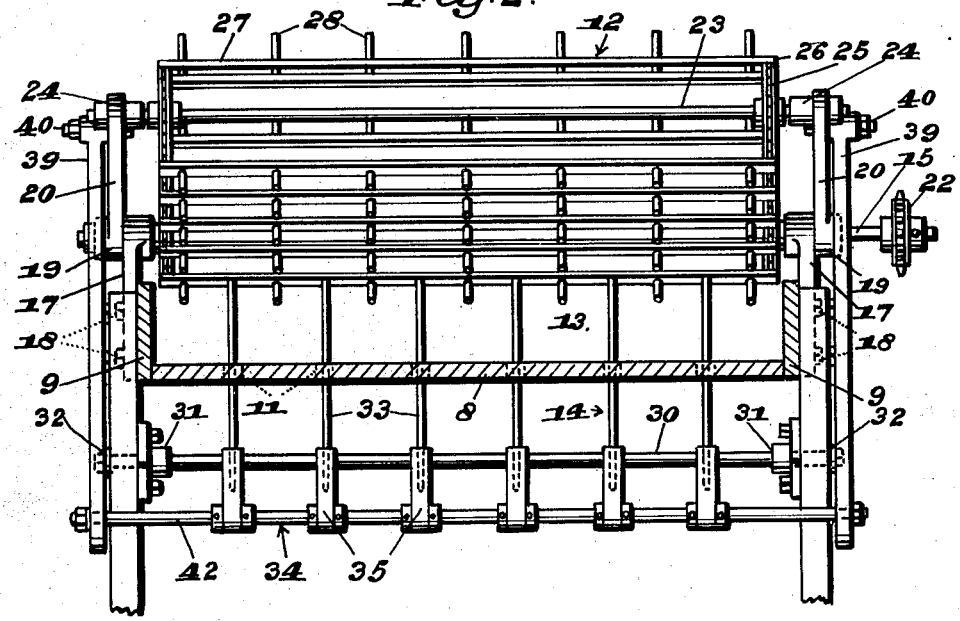

2,212,297

UNITED STATES PATENT OFFICE 2,212,297

FEEDER FOR THRESHING MACHINES

Carl R. Livermon, Roxobel, N. C.

Application October 15, 1937, Serial No. 169,310

10 Claims. (Cl. 130—1)

This invention relates to improvements in threshing machines, but more especially to the apparatus for feeding material thereinto. Since the instant feeder is particularly intended for use on a peanut vine threshing machine, the following description is predicated on that particular use, but it must be understood that the invention is not so confined.

The common practice in feeding peanut vines into the threshing machine is for a helper to fork the mass up and onto the feed table adjacently to which there is another helper who tears off quantities of the vine material and stuffs them into the feed throat. The chief fault of this mode of feeding the material is its lack of uniformity because at times the helper will tend to feed in sparse quantities, thus causing an unnecessary idling of the thresher, and at other times he will overfeed the thresher, imposing an unnecessary strain upon the mechanism with the likelihood of choking the thresher cylinder.

One of the underlying principles of the invention is to accomplish the feeding of vine material automatically, at least as far as its delivery into the feed throat is concerned. A helper will still be used to fork the material onto the feed table, but from there on the feeder attachment functions of its own accord, regulating the volume of the feed to such a fine degree that there is a perfectly uniform operation of the threshing machine with no losses due to the former uncertainty in the manner of feeding. With this preamble in mind, the objects of the invention are as follow:

First, to provide a chain conveyor which is loosely swung in respect to the feed table of the thresher so that the whole weight of its free end will rest upon the mass of vines and insure the advancement of the top layer of the vine material to the feed throat.

Second, to provide the combination of the loosely swung conveyor and a set of retarding pins, there being such a relative adjustment between these two parts that there will always be a vine passage of a determined depth through which the aforesaid top layer will be fed.

Third, to so link up or otherwise connect the aforesaid conveyor and retarding pin set that the up and down movements of the free end of the conveyor will be faithfully transmitted to the retarding pin set, the resulting mutual up and down motion in respect to the feed table preserving the adjusted depth of the vine passage.

Fourth, to provide an adjustment in said linkage enabling any desired variation of the depth of said vine passage within limits.

Fifth, to provide a feeder attachment for threshing machines wherein the mass of vines is held retarded upon the feed table and only the top layer of vine material is continuously combed off.

Other objects and advantages will appear in the following specification, reference being had to the accompanying drawings, in which:

Figure 1 is a longitudinal section of the improved feeder illustrating its application to a known type of threshing machine.

Figure 2 is a cross section taken on the line 2—2 of Fig. 1.

Figure 3 is a fractional cross section taken on the line 3—3 of Fig. 1.

Figure 4 is a fractional cross section taken on the line 4—4 of Fig. 1.

The peanut vine threshing machine is generally designated 1, only enough of the machine being shown to illustrate the application of the improved feeder. The thresher cylinder is diagrammatically indicated at 2, the slotted concave being designated 3, one of a pair of frame posts 4 and the shaft of the cylinder 5. The latter carries a sprocket 6 to which a drive chain 7 is applied.

The threshing machine 1 includes a feed table 8, the specific construction and disposition of which have no direct concern with the invention. The feed table is preferably boarded up at 9 on three sides so that it functions as a trough into which the mass of vines 10 is forked. The first distinction which the feed table has from known feed tables is the series of holes 11.

The feeder attachment is generally designated 12. It comprises the chain conveyor 13 and the set of retarding pins 14. The chain conveyor can be made in virtually any known manner, the following description being representative. It has a driven shaft 15, the ends 16 (Fig. 4) of which being journaled in bracket bearings 17 which extend up from the side boards 9 to which they are secured at 18.

Immediately at the outsides of the bracket bearings 17 the shaft ends 16 carry the hubs 19 (Fig. 4) of the side members 20 of the conveyor 13. Set collars 21 prevent undesired end movement of the hubs 19. A sprocket 22 on that end of the shaft 15 corresponding to the position of the sprocket 6 has the chain 7 applied to it so that the latter is able to drive the chain conveyor.

At its upper and free end (Fig. 1) the chain conveyor has an idler shaft 23 which connects the side members 20, the latter having bearings 24 in which the ends of the idler shaft are journaled. Both shafts 15 and 23 have matching sets of sprockets generally designated 25, to which chains 26 are applied. These chains are connected by cross slats 27 (Fig. 1) from each of which a series of studs or prongs 28 projects (Fig. 2). These studs comprise a comb, and the effect of their operation upon the vine mass 10 is to comb off a layer of material but the amount thus combed off is controlled by the retarding pin set 14 which comprises the following construction.

The support 29 of the feed table 8 or any other preferred support, is used as the pivotal mount for the rock shaft 30 of the retarding pin set 14. The support is fortified with bearing blocks 31 (Fig. 4) through which the ends of the shaft go, the virtual extremities of the latter having set collars 32 to prevent end motion. The retarding pins 33 are situated in upstanding relationship to a base 34 which can comprise either the plurality of arms 35 shown (Fig. 2) or they may be fixed in upstanding relationship to some preferred equivalent of this particular type of base.

The pins are arranged in a plurality of transverse series and the pins of the successive series are made taller out toward the free end of the pin set 14. In other words the first series next to the rock shaft 30 is lowest, and from there on the height of the pins in each series increases until the pins become tallest in the last series adjacent to the free end of the set. This arrangement is not always necessarily adhered to but suits the instant disposition of the feed table 8. As shown, the pins project through the holes 11, and the line 36 drawn across the tops of the projecting pins is substantially parallel to the bottom flight 37 of the chain conveyor. These two boundaries define what has been called the vine passage and this passage is now designated 38.

Links 39 connect the free ends of the chain conveyor and the retarding pin set 14. The tops of the links are swung from wrist pins 40 (Fig. 3) which project from the side members 20. The bottom ends of these links have plural holes 41 for adjustment, a rod 42 (Fig. 3) having its ends inserted in a set of that section which will establish the approximate parallelism of the line 36 to the flight 37. The free ends of the arms 35 are pivotally attached to this rod, and it is readily seen that as the chain conveyor 13 moves up and down between the full and dotted line positions, the retarding pin set 14 will faithfully respond, preserving the vertical dimension of the passage 38.

It is possible to vary the size of this passage by setting the rod 42 in hole sets 41 of some other selection. The line 36 may then not be parallel to the flight 37 but studs 28 will nevertheless act to comb off a layer of vine material from the mass 10, this being more definitely understood from the following description of

*The operation*

The chain conveyor is loosely swung upon the driven shaft 15, its free and remote end resting upon the vine mass 10. Inasmuch as the studs travel in the direction of the arrow *a* (Fig. 1) it follows that portions of the vine mass are combed through the passage 38 in the direction of the arrow *b* and into the throat of the threshing machine 1.

The retarding pin set 14 is linked up to the chain conveyor in any suitable manner, for example by the links 39 described, and since it too is loosely swung upon the rock shaft 30, and has its remote end free with the exception of the limiting function of the links it follows that every movement of the chain conveyor will be faithfully reproduced in the retarding pin set.

As the result of the mutual movement of the conveyor and pin set the pins 33 are made to project above the feed table 8 to varied extents, always keeping the depth of the passage 38 approximately the same. Thus most of the vine mass 10 will be held back by the protruding portions of the pins 33 and only so much as lies above the line 36 will be combed off and advanced toward the feed throat, as already brought out.

I claim:

1. A feeder comprising a stationary feed table, feeder means for continually advancing material across said table toward the throat of a threshing machine, laterally spaced retarding means having operative portions situated in the path of the material, and means coupling the feeder means and retarder means for synchronized vertical operation, causing a variable penetration of said material by said retarding means to variably retard a portion of the material yet enable the feeder means to comb off a layer for delivery into said throat.

2. A feeder comprising a stationary feed table, feeder means loosely swung in respect to said table tending to continuously advance a mass of material across said table, the free end of said feeder means bearing down upon said mass, a set of retarding pins spaced transversely of each other and occupying substantially constant positions in reference to the feeder means, the operative portions of said pins being located between said table and feeder means for holding back the mass of material, but also being in spaced relationship to said feeder means, thereby to define a passage through which a portion of said material is combed off of the mass, and means interconnecting the retarding pin set and feeder means.

3. A feeder comprising a feed table which has holes, a conveyor above the table having means upon which it is loosely swung at one end so that its free end can rest upon a mass of material upon the feed table, a retarding pin set situated below the table having means upon which it is loosely swung at one end adjacently to the swinging means of the conveyor, said set including pins which protrude through said holes toward the conveyor, and means connecting the free ends of the conveyor and retarding pin set, maintaining a space between the ends of the pins and the adjacent part of the conveyor and causing a correspondence of movement of the pin set to the movements of the conveyor as it changes its position due to variations in the mass upon which it rests.

4. A feeder comprising a feed table which has holes, a studded conveyor above the feed table, a shaft supported in respect to the feed table, constituting the drive for the conveyor as well as the mount upon which the conveyor is loosely swung, the free end of the conveyor being adapted to rest upon a mass of material on the feed table, a retarding pin set below the table comprising a base and pins which project up through the holes into confronting relationship to the studs of the conveyor, a rock shaft supported in respect to the feed table upon which the pin set is turnable, and a linkage connecting the free end of the conveyor to the free end of the base, maintaining a passage between the confronting ends of the studs and pins and causing the pin set to move up and down as the conveyor moves up and down.

5. A feeder comprising a feed table upon which a mass of material is piled preparatory to its advance to a feed throat, a studded conveyor operable above the feed table, driving means for one end of the conveyor, the other end of the conveyor being left free to rest upon the mass and continuously advance the material toward the throat, retarding pins projecting up through the feed table, and means so connecting the free end of the conveyor to the retarding pins that the latter are made to fall and rise with respect to the feed table as the free end of the conveyor lowers and rises with decreasing and increasing amounts of the material.

6. A feeder comprising feeder means pivoted at one end to swing loosely at its other end, tending to continuously advance a mass of material upon which said other end is rested, toward the throat of a threshing machine, retarding means pivoted at one end to swing loosely at its other end and being in substantially constant spaced relationship to the feeder means to define a passage, a feed table to which the feeder means is in superposed relationship and through which the retarding means is operable, and a linkage connecting the loose ends of the feeder and retarding means to produce said substantially constant spacing and to transfer the motions of the feeder means due to variations in volumes of the mass.

7. A feeder comprising a studded conveyor, a retarding pin set including retarding pins which confront one of the studded flights of the conveyor, a feed table above which the conveyor is operable and through which the pins are shiftable, separate means adjacent to each other upon which the conveyor and pin set are loosely swung, and means connecting the conveyor and pin set at their ends opposite to those at which they are loosely swung to cause a synchronous swinging of said conveyor and retarding pin set and a variable penetration of material on said table by the retarding pins.

8. A feeder comprising a studded conveyor, a retarding pin set including retarding pins which confront one of the studded flights of the conveyor, separate means adjacent to each other upon which the conveyor and pin set are loosely swung, means connecting the conveyor and pin set at their ends opposite to those at which they are loosely swung to cause a synchronous swinging of the conveyor and retarding pin set, and a feed table situated medially of the conveyor and pin set and having the pin set operable therethrough to variably penetrate and retard a mass of material discharged onto the feed table.

9. A feeder comprising a feed table, feeder means movably mounted over the feed table to rise and fall with variations in the volume of material advanced thereby across the top surface of the feed table toward a throat to be fed, retarding means movable in respect to said table surface to variously penetrate said material, and means coupling the retarding means to the feeder means for synchronous penetration of said material and withdrawal therefrom by said retarding means as said feeder means rises and falls.

10. A feeder comprising a feed table, feeder means movably mounted over the feed table to rise and fall with variations in the volume of material advanced thereby across the top surface of the feed table toward a throat to be fed, retarding means movably mounted below said table, being operable therethrough to variously penetrate said material, and means coupling the retarding means to the feeder means for a synchronous penetration of said material and withdrawal therefrom by said retarding means as said feeder means rises and falls.

CARL R. LIVERMON.